US012731835B2

(12) United States Patent
Kagami

(10) Patent No.: US 12,731,835 B2
(45) Date of Patent: Sep. 8, 2026

(54) BATTERY

(71) Applicant: TOYOTA JIDOSHA KABUSHIKI KAISHA, Toyota (JP)

(72) Inventor: Ryo Kagami, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 709 days.

(21) Appl. No.: 18/067,090

(22) Filed: Dec. 16, 2022

(65) Prior Publication Data

US 2023/0216114 A1 Jul. 6, 2023

(30) Foreign Application Priority Data

Jan. 5, 2022 (JP) ................................ 2022-000548

(51) Int. Cl.
*H01M 50/14* (2021.01)
*H01M 50/103* (2021.01)
*H01M 50/46* (2021.01)

(52) U.S. Cl.
CPC ......... *H01M 50/14* (2021.01); *H01M 50/103* (2021.01); *H01M 50/46* (2021.01)

(58) Field of Classification Search
CPC ..... H01M 50/14; H01M 50/103; H01M 50/46
See application file for complete search history.

(56) References Cited

U.S. PATENT DOCUMENTS 4,732,825 A * 3/1988 Kamata ............... H01M 50/193 429/185
2018/0269449 A1* 9/2018 Okado ............... H01M 50/293

FOREIGN PATENT DOCUMENTS

JP 2004039271 A * 2/2004
JP 2009181897 A 8/2009
JP 202013637 A † 1/2020
JP 2020013637 A * 1/2020

* cited by examiner
† cited by third party

*Primary Examiner* — Allison Bourke
*Assistant Examiner* — Verita E Grannum
(74) *Attorney, Agent, or Firm* — Dickinson Wright, PLLC

(57) ABSTRACT

To suppress formation of wrinkles at any corner of a joint portion of an exterior body to suppress the breakage of the exterior body, a battery includes: an electrode body that is a quadrilateral in a plan view; and an exterior body housing the electrode body therein, wherein the exterior body has a joint portion along at least three sides thereof in a circumferential end thereof, a spacer is arranged between each corner of the electrode body and an inner surface of the exterior body, and the spacer has a projection extending toward the joint portion of the exterior body.

4 Claims, 17 Drawing Sheets

BATTERY

FIELD

The present disclosure relates to a battery that has an electrode body and an exterior body in which the electrode body is housed.

BACKGROUND

Patent literature 1 discloses the composition of a battery formed by hermetically sealing a rectangular electrode body in laminated films (exterior body): the composition is such that spacers are arranged between the corner of the rectangular electrode body and the laminated films. Patent literature 1 discloses that this composition can suppress concentrated formation of wrinkles particularly at the corners of the laminated films, prevent metal foil layers in the laminated films from breaking, and prevent the battery performance from deteriorating.

CITATION LIST

Patent Literature

Patent Literature 1: JP 2004-39271 A

SUMMARY

Technical Problem

However, the situation where wrinkles are formed at the corners is ascertained even when spacers as disclosed in patent literature 1 is arranged: in this situation, the laminated films may break.

In view of that background, an object of the present disclosure is to suppress formation of wrinkles at any corner of a joint portion of an exterior body to suppress the breakage of the exterior body.

Solution to Problem

As a result of his diligent studies, the inventor of the present disclosure has found that: as shown in a partial cross-sectional view of a conventional spacer in FIG. 17, there exists a space S formed of a nonjoint portion between laminated films, as indicated by S in FIG. 17, between a joint portion of the laminated films and the spacer at each corner between the laminated films (in an exterior body); and this space S is a cause of formation of wrinkles, and completed the present disclosure.

The present application discloses a battery comprising: an electrode body that is a quadrilateral in a plan view; and an exterior body housing the electrode body therein, wherein the exterior body has a joint portion along at least three sides thereof in a circumferential end thereof, a spacer is arranged between each corner of the electrode body and an inner surface of the exterior body, and the spacer has a projection extending toward the joint portion of the exterior body.

The projection may be formed so as to be tapered to a tip thereof.

The projection may have a face inclining toward the joint portion in a thickness direction of the electrode body.

The projection may have a concave surface.

Advantageous Effects

According to the battery of the present disclosure, the projection of the spacer is arranged in the space formed at each corner of the joint portion of the exterior body where deformation is concentrated, which can suppress formation of wrinkles to suppress the breakage of the exterior body.

BRIEF DESCRIPTION OF DRAWINGS

FIG. 5 is a partially enlarged view of FIG. 2;

DESCRIPTION OF EMBODIMENTS

1. Battery

Figure 1:
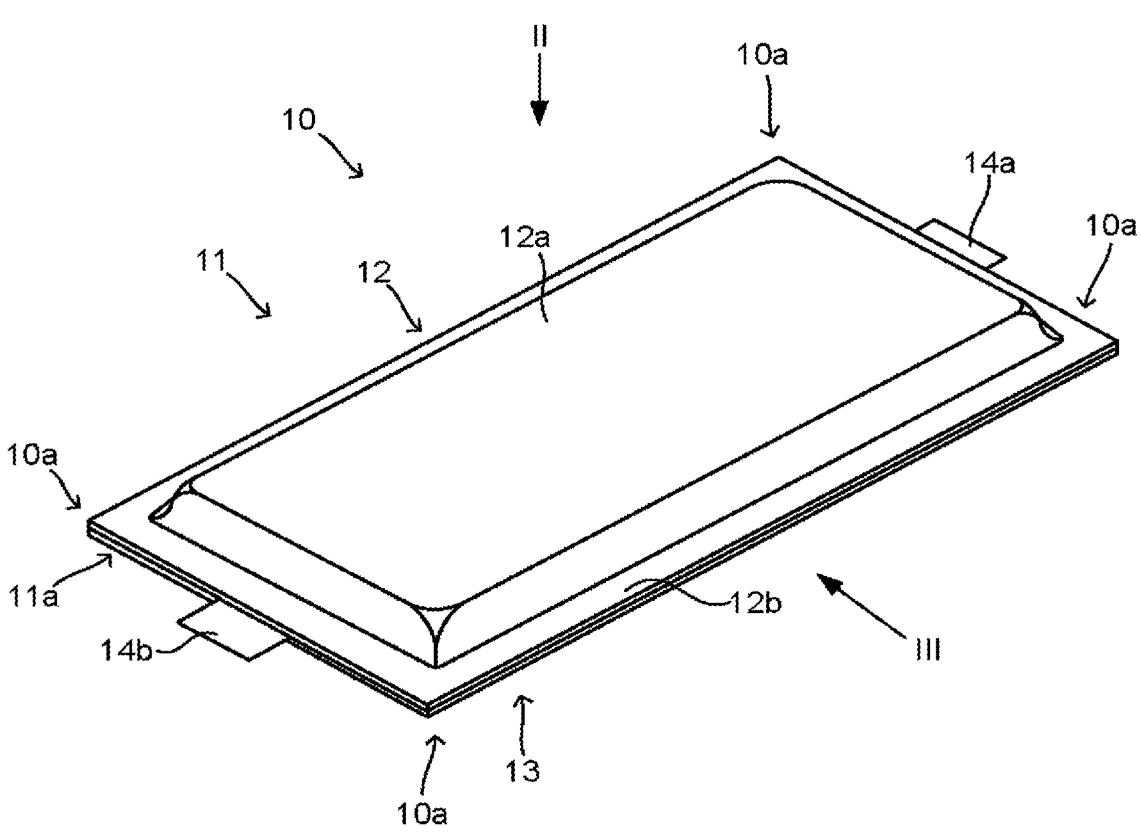
FIG. 1 is an external perspective view of an all-solid-state battery 10.
Figure 2:
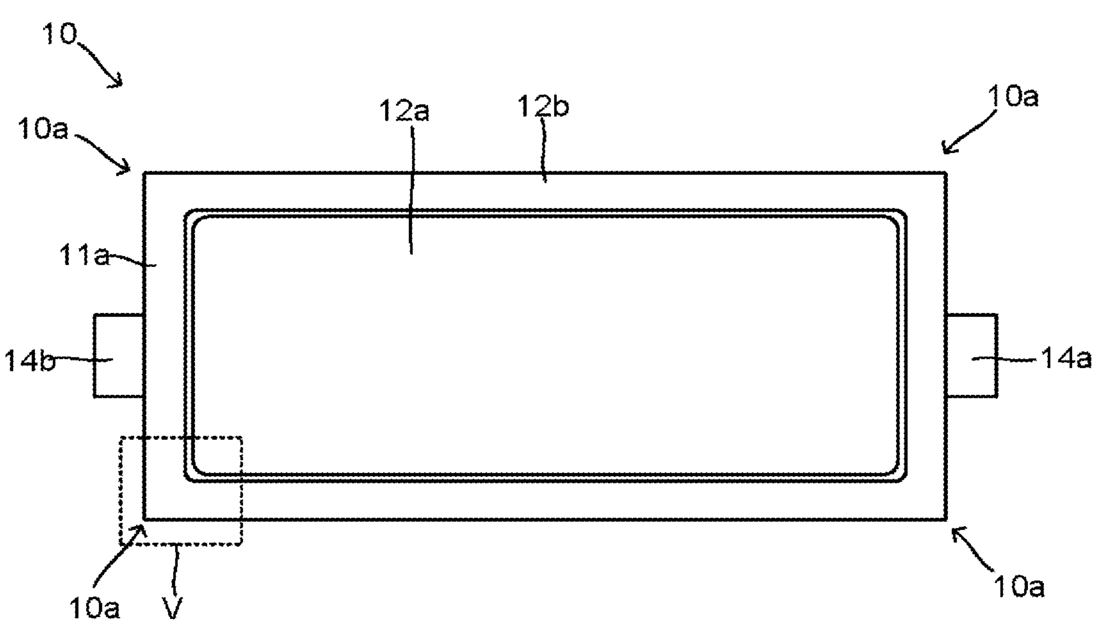
FIG. 2 is a plan view of the all-solid-state battery 10.
Figure 3:
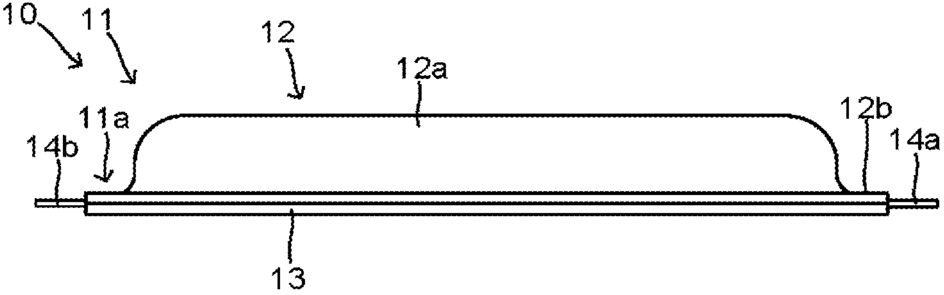
FIG. 3 is a front view of the all-solid-state battery 10.
Figure 4:
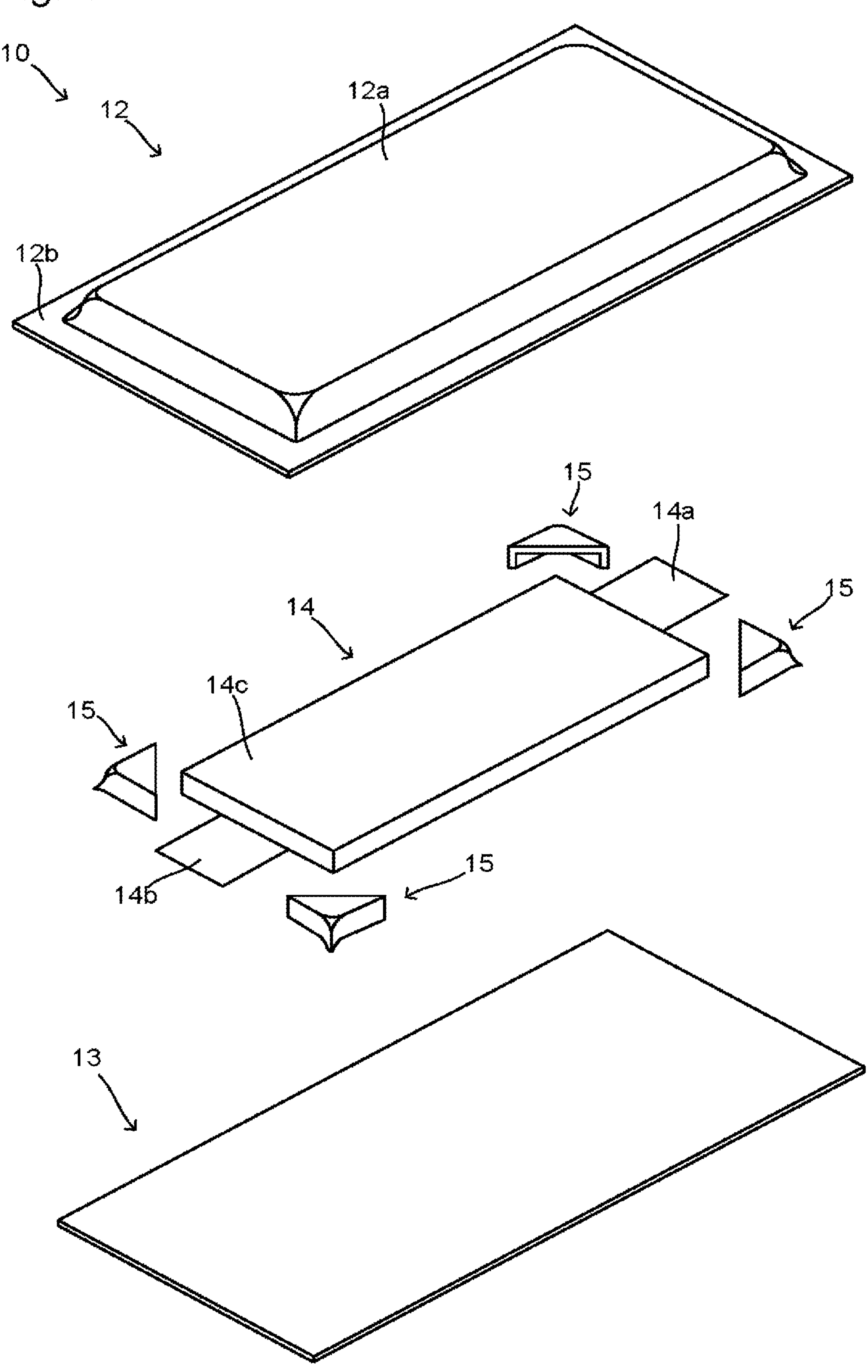
FIG. 4 is an exploded perspective view of the all-solid-state battery 10.

FIGS. 1 to 4 each illustrate an all-solid-state battery 10 according to one embodiment. The all-solid-state battery will be described herein as a typical example. However, the present disclosure is not necessarily applied to all-solid-state batteries, but may be applied to any battery as long as the battery has an electrode body and an exterior body in which the electrode body is sealed. FIG. 1 is an external perspective view, FIG. 2 is a plan view (a view looking in the direction indicated by the arrow II of FIG. 1), FIG. 3 is a front view (a view looking in the direction indicated by the arrow III of FIG. 1), and FIG. 4 is an exploded perspective view.

Figure 5:
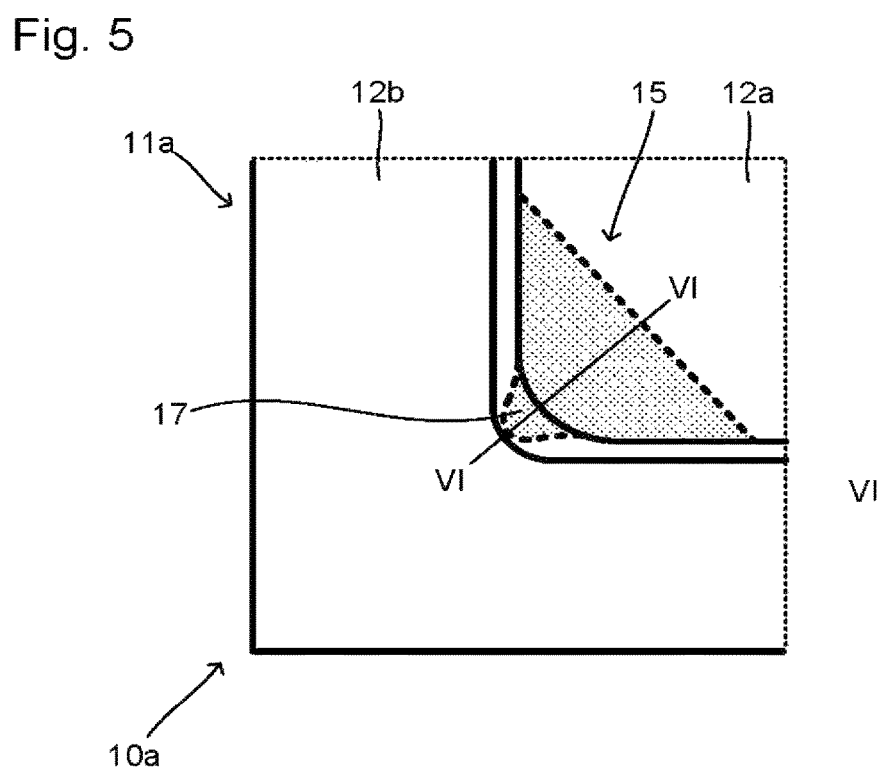
Figure 6:
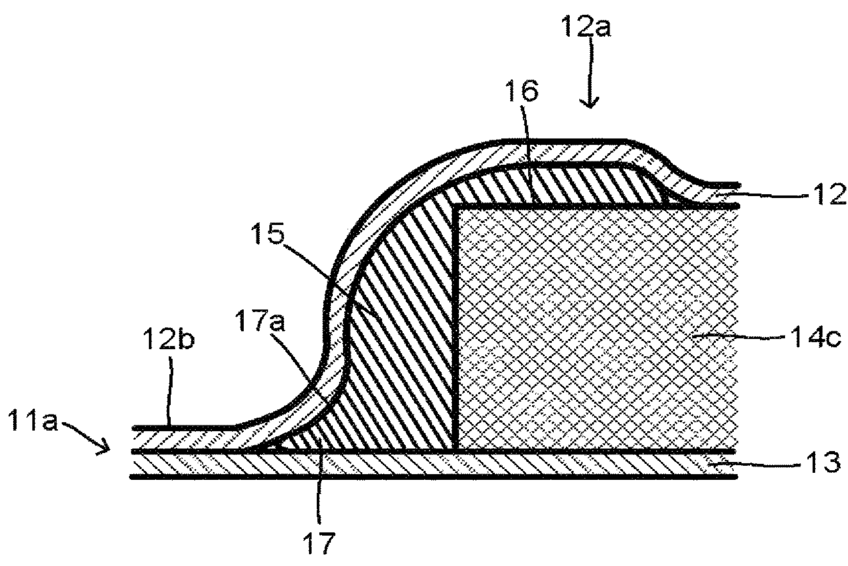
FIG. 6 is a cross-sectional view taken along VI-VI.

FIG. 5 is an enlarged view of a portion indicated by V in FIG. 2. In this drawing, one corner 10*a* of the all-solid-state battery 10 is focused on. FIG. 5 transparently shows an exterior body 11 so that a spacer 15 arranged inside the exterior body 11 can be seen. FIG. 6 is a cross-sectional view taken along the line indicated by VI-VI in FIG. 5.

As can be seen from FIGS. 1 to 6, the all-solid-state battery 10 according to the present embodiment has the exterior body 11 (a first exterior body 12 and a second exterior body 13), an electrode body 14, and the spacers 15. Each of the spacers 15 is arranged at the four corners of the electrode body 14, which is a rectangular parallelepiped and is approximately a quadrilateral in a plan view. The electrode body 14 with the spacers 15 attached thereto is contained in the exterior body 11. At this time, a cathode terminal 14*a* and an anode terminal 14*b* are extendedly arranged from the electrode body 14, so that the tips thereof protrude from the exterior body 11.

Hereinafter the structure of each member and the relationship thereamong will be described.

1.1. Exterior Body

In this embodiment, the exterior body 11 is formed of a sheet-like member that is a quadrangle in a plan view. In this embodiment, the exterior body 11 includes the first exterior body 12 and the second exterior body 13. The electrode body 14 and the spacers 15 are contained in the space between these first exterior body 12 and second exterior body 13. The circumferential end of the first exterior body 12 and the circumferential end of the second exterior body 13 are joined to each other to form a joint portion 11*a*. Therefore, this exterior body 11 is in the form of a bag. The electrode body 14 and the spacers 15 are contained and sealed in the inside of this bag.

The first exterior body 12 is a quadrangle in a plan view. The first exterior body 12 has a depression 12*a* that is a quadrangle in a plan view (the opening of the depression 12*a* is invisible in FIG. 4 because being on the bottom side in this drawing sheet, and thus, entering a blind spot). The electrode body 14 and the spacers 15 are housed in the inside of this depression 12*a*. The circumferential edge of the depression 12*a* is provided with an overhang 12*b*, so that the overhang 12*b* overhangs therefrom. This overhang 12*b* and the circumferential end on one side of the second exterior body 13 are joined to each other to form the joint portion 11*a*.

The second exterior body 13 is in the form of a sheet and is a quadrangle in a plan view. As described above, the circumferential end on the one side of the second exterior body 13, which faces the overhang 12*b* of the first electrode body 12, is superposed on and joined to the overhang 12*b* of the first exterior body 12 to form the joint portion 11*a*.

In the present embodiment, the first exterior body 12 and the second exterior body 13 are each formed of a laminated film. The laminated films herein are each a film having a metal layer and a sealant material layer. Examples of a metal that is used for the metal layers of the laminated films include aluminum and stainless steel. Examples of a material that is used for the sealant material layers include polypropylene, polyethylene, polystyrene, and polyvinyl chloride that are thermoplastic resins.

The method of joining the first exterior body 12 and the second exterior body 13 to each other, that is, joining the laminated films is not particularly limited, but any known method may be used therefor. Specific examples of this method include: welding (e.g., hot plate welding, ultrasonic welding, vibration welding, and laser welding) the sealant material layers of the laminated films to each other; and adhering with an adhesive.

1.2. Electrode Body

The electrode body 14 has a cathode current collector layer, a cathode mixture layer, a separator layer, an anode mixture layer, an anode current collector layer, the cathode terminal 14*a*, and the anode terminal 14*b*. In this embodiment, the electrode body 14 is formed by stacking plural unit elements each formed by stacking a cathode current collector layer, a cathode mixture layer, a separator layer, an anode mixture layer, an anode current collector layer, an anode mixture layer, a separator layer, a cathode mixture layer, and a cathode current collector layer in this order (which may be referred to as "a stack 14*c*"). The cathode terminal 14*a* is electrically connected to the cathode current collector layers of the stack 14*c*; and the anode terminal 14*b* is electrically connected to the anode current collector layer of the stack 14*c*.

The stack 14*c* is in the form of a rectangular parallelepiped and is a quadrilateral in a plan view, too.

1.2a. Cathode Current Collector Layer

The cathode current collector layers are stacked on the cathode mixture layers, respectively, to collect a current from the cathode mixture layers. Each of the cathode current collector layers is in the form of foil and is a quadrilateral in a plan view. In this embodiment, each of the cathode current collector layers is formed of cathode current collector foil that is a metal foil, and a carbon layer stacked on the cathode current collector foil. The carbon layer is stacked on each of the cathode mixture layers, and thereby, the cathode current collector layers are stacked on the cathode mixture layers.

Examples of the material constituting the cathode current collector foil include stainless steel, aluminum, nickel, iron, and titanium. The carbon layer is formed from a carbon-containing material.

1.2b. Cathode Mixture Layer

The cathode current collector layers are stacked on the cathode mixture layers, respectively, on any one side of the cathode mixture layers; and the separator layers are stacked on the cathode mixture layers, respectively, on the other side of the cathode mixture layers. Each of the cathode mixture layers is in the form of a sheet and is a quadrilateral in a plan view.

Each of the cathode mixture layers is a layer containing a cathode active material, and may further contain at least one of a solid electrolyte material, a conductive material, and a binder, if necessary.

Any known active material may be used as the cathode active material. Examples of the cathode active material include cobalt-based (such as $LiCoO_2$), nickel-based (such as $LiNiO_2$), manganese-based (such as $LiMn_2O_4$ and $Li_2Mn_2O_3$), iron phosphate-based (such as $LiFePO_4$ and $Li_2FeP_2O_7$), NCA-based (such as a compound of nickel, cobalt, and aluminum), and NMC-based (such as a compound of nickel, manganese and cobalt) active materials; and a more specific example thereof is $LiNi_{1/3}Co_{1/3}Mn_{1/3}O_2$.

The surface of the cathode active material may be coated with an oxide layer such as a lithium niobate layer, a lithium titanate layer, and a lithium phosphate layer.

The solid electrolyte is preferably an inorganic solid electrolyte because the inorganic solid electrolyte has higher ionic conductivity than, and superior heat resistance to the organic polymer electrolyte. Examples of the inorganic solid electrolyte herein include sulfide solid electrolytes and oxide solid electrolytes.

Examples of sulfide solid electrolyte materials having Li-ion conductivity include $Li_2S—P_2S_5$, $Li_2S—P_2S_5—LiI$, $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—ZmSn$ (where m and n are positive numbers, and Z is any of Ge, Zn and Ga), $Li_2S—GeS_2$, $Li_2S—SiS_2—Li_3PO_4$ and $Li_2S—SiS_2—Li_xMO_y$ (where x and y are positive numbers, and M is any of P, Si, Ge, B, Al, Ga and In). The expression "$Li_2S—P_2S_5$" means any sulfide solid electrolyte material made with a raw material composition containing $Li_2S$ and $P_2S_5$. The same is applied to the other expressions.

Examples of oxide solid electrolyte materials having Li-ion conductivity include compounds having a NASICON-like structure. Examples of compounds having a NASICON-like structure include compounds represented by the general formula $Li_{1+x}Al_xGe_{2-x}(PO_4)_3$ ($0 \le x \le 2$) (that is, LAGP), and compounds represented by the general formula $Li_{1+x}Al_xTi_{2-x}(PO_4)_3$ ($0 \le x \le 2$) (that is, LATP). Other examples of the oxide solid electrolyte materials include LiLaTiO (such as $Li_{0.34}La_{0.51}TiO_3$), LiPON (such as $Li_{2.9}PO_{3.3}N_{0.46}$), and LiLaZrO (such as $Li_7La_3Zr_2O_{12}$).

The binder herein is not particularly limited as long as being chemically and electrically stable. Examples of the binder include fluorine-based binders such as polyvinylidene fluoride (PVDF) and polytetrafluoroethylene (PTFE), rubber-based binders such as styrene-butadiene rubber (SBR), olefinic binders such as polypropylene (PP) and polyethylene (PE), and cellulose-based binders such as carboxymethyl cellulose (CMC).

As the conductive material herein, a carbon material such as acetylene black (AB), Ketjen black, and carbon fiber, or a metal material such as nickel, aluminum, and stainless steel may be used.

The content of each component in each of the cathode mixture layers may be the same as in a conventional cathode mixture layer. The cathode mixture layers each preferably have a thickness of, for example, 0.1 μm to 1 mm, and each more preferably have a thickness of 1 μm to 150 μm.

1.2c. Separator Layer

Each of the separator layers (solid electrolyte layers) is in the form of a sheet and is a quadrilateral in a plan view. Each of the separator layers is a layer that is arranged between any of the cathode mixture layers and any of the anode mixture layers and is formed by containing a solid electrolyte material. This solid electrolyte material may be considered in the same manner as that described for the cathode mixture layers.

1.2d. Anode Mixture Layer

Each of the anode mixture layers is a layer containing at least an anode active material. Each of the anode mixture layers may contain a binder, a conductive material, and a solid electrolyte material, if necessary. The binder, the conductive material, and the solid electrolyte material herein may be considered in the same manner as those for the cathode mixture layers.

The anode active material is not particularly limited. When the anode mixture layers form a lithium ion battery, examples of the anode active material include carbon materials such as graphite and hard carbon, various oxides such as lithium titanate, Si and Si alloys, and metallic lithium and lithium alloys.

Each of the anode mixture layers is in the form of a sheet and is a quadrilateral in a plan view. The separator layers are stacked on the anode mixture layers, respectively, on any one side of the anode mixture layers; and the anode current collector layer is stacked on the anode mixture layers on the other sides of the anode mixture layers.

The content of each component in each of the anode mixture layers may be the same as in a conventional anode mixture layer. The anode mixture layers each preferably have a thickness of, for example, 0.1 μm to 1 mm, and each more preferably have a thickness of 1 μm to 150 μm.

1.2e. Anode Current Collector Layer

The anode current collector layer is stacked on the anode mixture layers to collect a current from the anode mixture layers. The anode current collector layer is in the form of foil and is a quadrilateral in a plan view. For example, the anode current collector layer can be formed from stainless steel, copper, nickel, or carbon.

1.2f. Cathode Terminal and Anode Terminal

The cathode terminal 14*a* and the anode terminal 14*b* are electroconductive members and are to be terminals for electrically connecting respective electrodes to the outside.

One end of the cathode terminal 14*a* is electrically connected to the cathode current collector layers; and the other end thereof penetrates the joint portion 11*a* of the first exterior body 12 and the second exterior body 13 to be exposed to the outside.

One end of the anode terminal 14*b* is electrically connected to the anode current collector layer; and the other end thereof penetrates the joint portion 11*a* of the first exterior body 12 and the second exterior body 13 to be exposed to the outside.

1.3. Spacer

Figure 7:
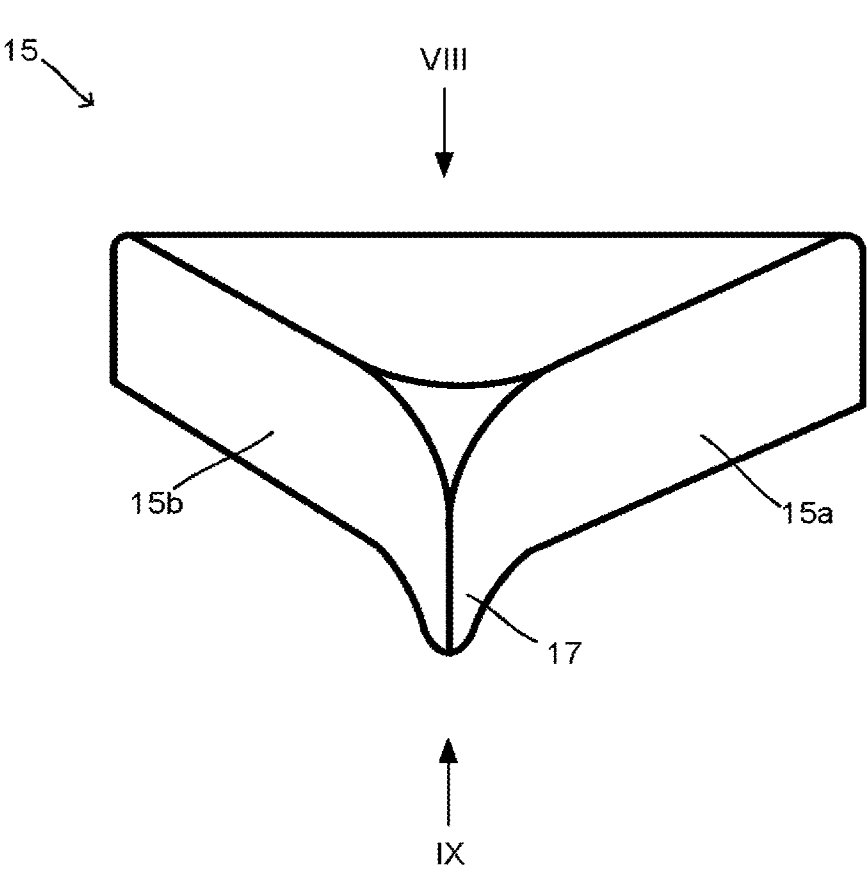
FIG. 7 is an external perspective view of a spacer 15.
Figure 8:
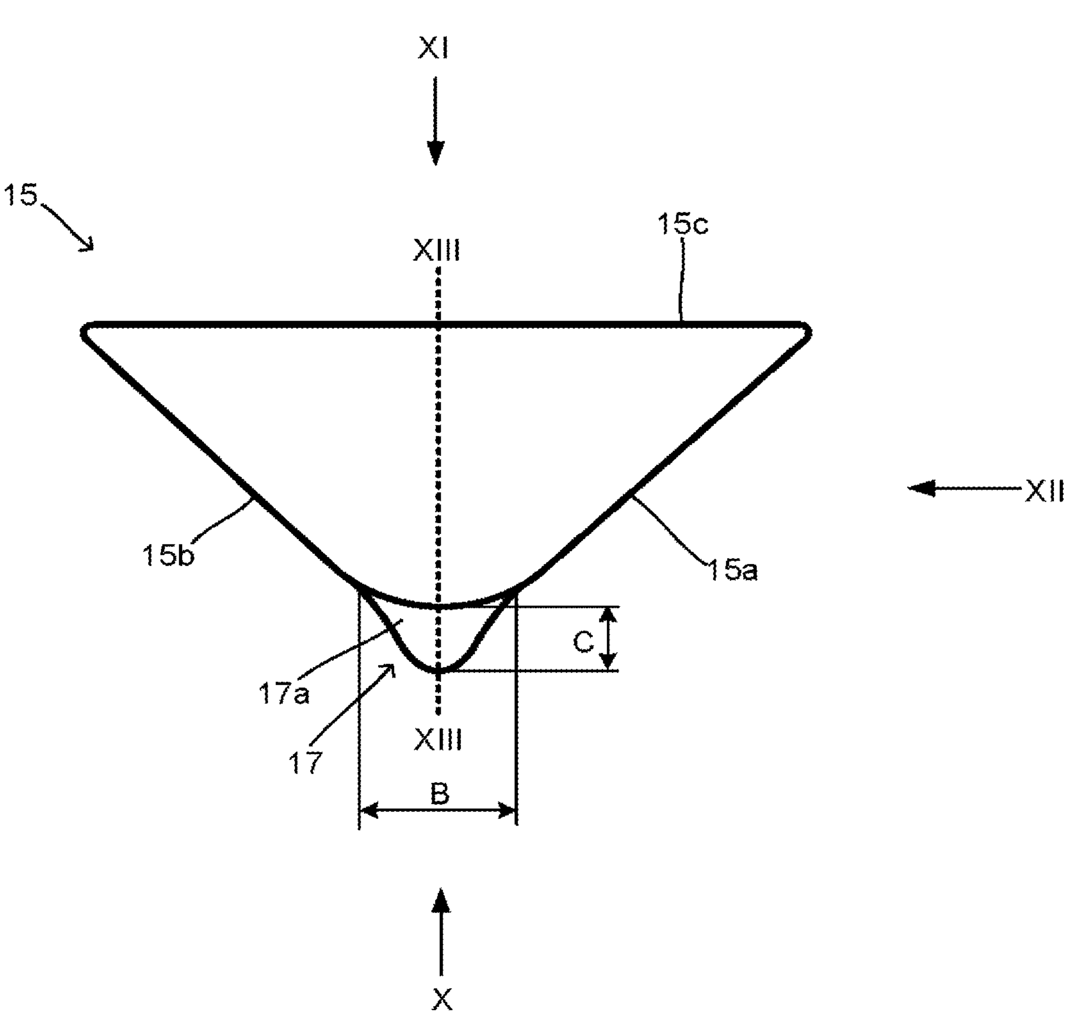
FIG. 8 is a plan view of the spacer 15.
Figure 9:
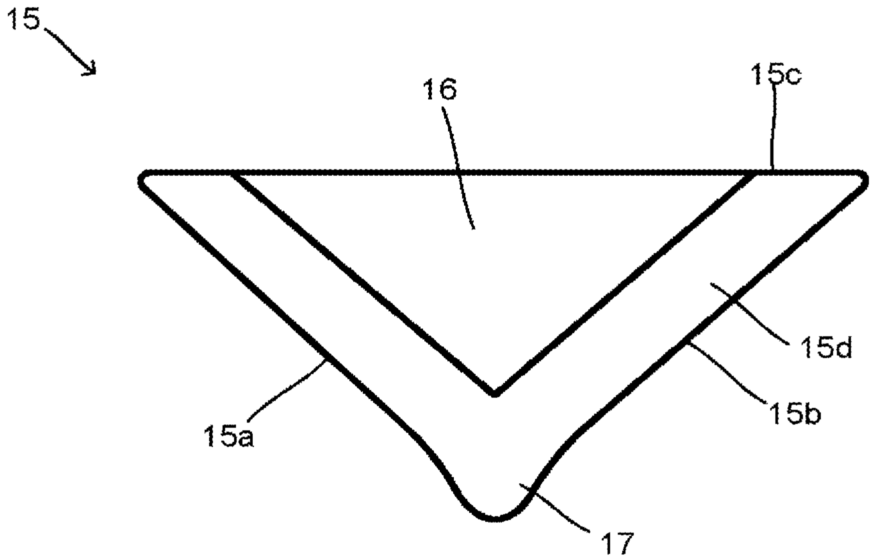
FIG. 9 is a bottom view of the spacer 15.
Figure 10:
FIG. 10 is a front view of the spacer 15.
Figure 10:
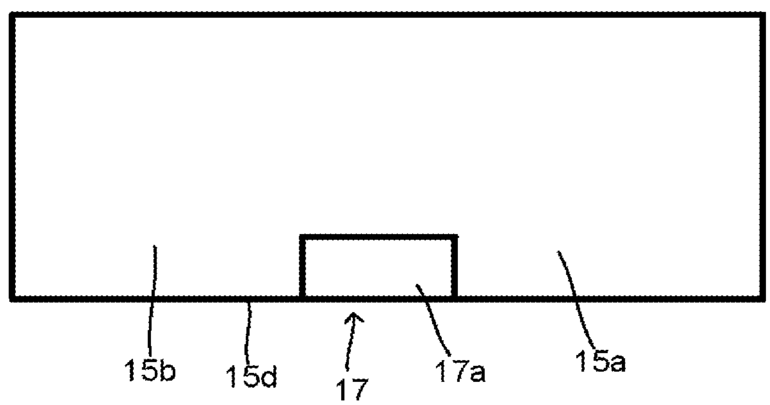
Figure 11:
FIG. 11 is a rear view of the spacer 15.
Figure 11:
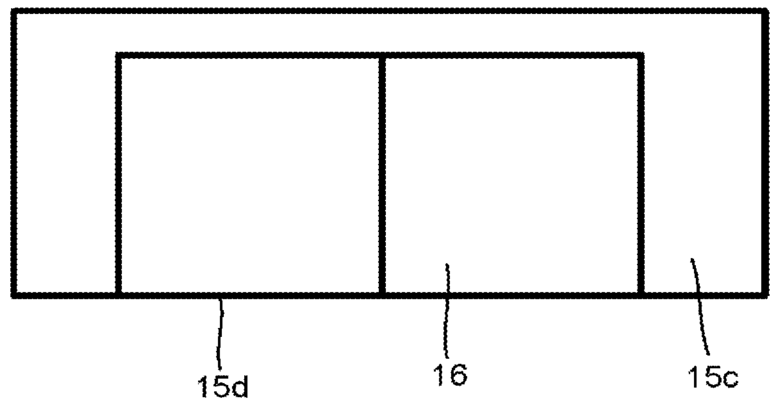
Figure 12:
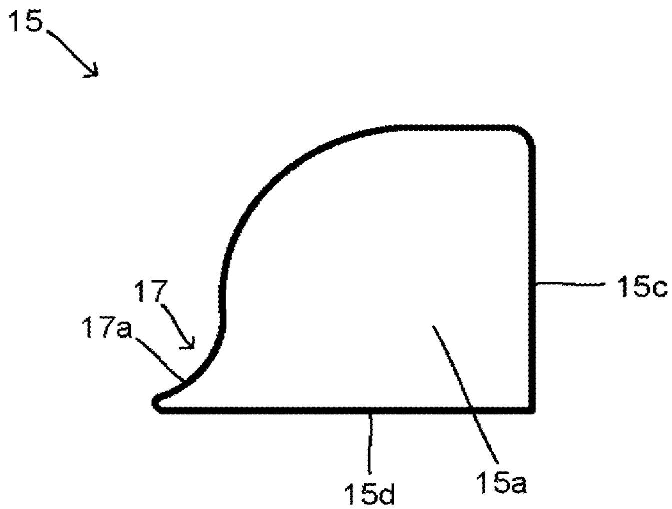
FIG. 12 is a side view of the spacer 15.
Figure 13:
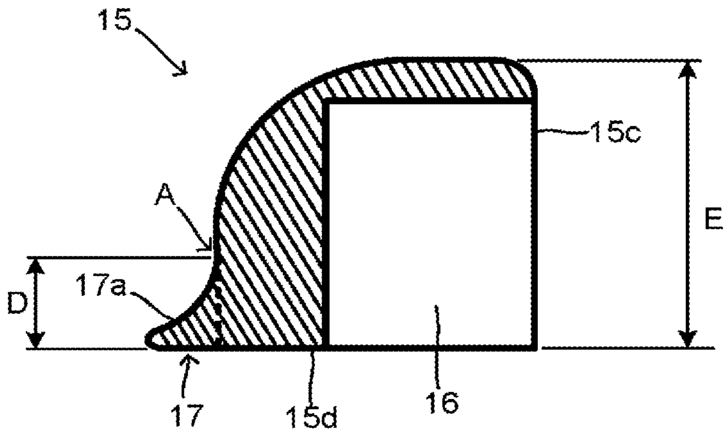
FIG. 13 is a cross-sectional view of the spacer 15.

Each of the spacers 15 is a member arranged between the stack 14*c* of the electrode body 14, and the inner surface of the depression 12*a* of the first exterior body 12 at the corners 10*a* of the all-solid-state battery 10. FIGS. 7 to 13 each illustrate one of the spacers 15. FIG. 7 is an external perspective view, FIG. 8 is a plan view (a view looking in the direction indicated by the arrow VIII of FIG. 7), FIG. 9 is a bottom view (a view looking in the direction indicated by the arrow IX of FIG. 7), FIG. 10 is a front view (a view looking in the direction indicated by the arrow X of FIG. 8), FIG. 11 is a rear view (a view looking in the direction indicated by the arrow XI of FIG. 8), FIG. 12 is a side view (a view looking in the direction indicated by the arrow XII of FIG. 8), and FIG. 13 is a cross-sectional view taken along the line indicated by XIII-XIII of FIG. 8.

As can be seen from FIGS. 5 and 8, the spacer 15 is approximately a triangle in a plan view. The spacers 15 are formed so as to fit the corners on the inner surface of the depression 12*a* of the exterior body 11, respectively. Therefore, the angle formed between side faces 15*a* and 15*b* of each spacer 15 which fits each corner on the inner surface of the depression 12*a* of the exterior body 11 in a plan view is approximately 90°. Thus, in this embodiment, the spacers 15 are each a member in the form of a triangular prism.

As shown in FIGS. 6, 9, 11 and 13, a groove 16 into which each corner of the stack 14*c* of the electrode body 14 is inserted is set for each spacer 15. The groove 16 has a mode and a shape that allow each corner of the stack 14*c* of the electrode body 14 to be housed therein. Thus, the groove 16 is an opening in a side face 15*c* (a side face between the side faces 15*a* and 15*b*) and a bottom face 15*d*. The groove 16 is not particularly limited, but, for example, may be a right-angled triangle in a plan view (a bottom view) as in the present embodiment.

Preferably, in particular edges of each spacer 15 that are in contact with the inner surface of the exterior body 11 each have an edge removal shape, i.e., a linear edge removal shape (a so-called chamfer shape) or a curved edge removal shape (a so-called round shape). This can reduce the risk of the edges of the spacers 15 to break through the exterior body 11 (the laminated films).

In particular, as shown in FIGS. 8 and 13, the edges formed by the side faces 15*a* and 15*b* are each preferably in the form of a curved face. Stress easily concentrates on these portions of the edges since this portions face the corners of the depression 12*a* of the exterior body 11. Thus, the edges each in the form of a curved face can ease such stress concentration, which can suppress the breakage of the exterior body 11.

Each spacer 15 has a projection 17 at the edge formed by the side faces 15*a* and 15*b* on the bottom face 15*d* side; thereby, the projection 17 is positioned at each corner of the depression 12*a* of the exterior body 11 when each spacer 15 has a posture in arrangement in the all-solid-state battery 10.

Figure 17:
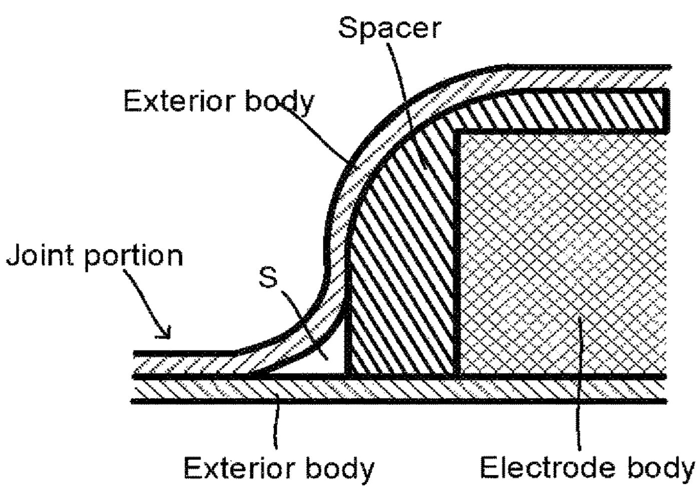
FIG. 17 illustrates a conventional example.

As shown in FIG. 6, the projection 17 is formed to reduce the size of the space S, which is formed of a nonjoint portion in the exterior body that is generated between the joint portion and each spacer, and which has been described using FIG. 17. The specific shape of the projection 17 is not particularly limited when the projection 17 has a shape that can reduce the space S as described. As a more effective shape, as well shown in FIGS. 6 and 13, preferably, the projection 17 has an inclined face 17*a* that inclines toward the joint portion 11*a* in the thickness direction (the stacking direction of each layer in the electrode body 14). This gives the projection 17 a shape inclining so as to be tapered to the joint portion 11*a*, which can efficiently reduce the space between the joint portion 11*a* and each spacer 15 at each corner.

The form of the inclined face 17*a* is not particularly limited, but may be a plane, or, as shown in FIGS. 6 and 13, a concave surface. The inclined face 17*a* of a concave surface can suppress a rapid change in the exterior body 11, which is arranged thereover, to ease stress concentration.

Preferably, the width of the projection 17 (the size in the direction indicated by B in FIG. 8) is also formed to be tapered to the tip of the projection 17. This causes the projection 17 to fit the shape of each corner, which can more efficiently reduce the spaces between the joint portion 11*a* and the spacers 15 at the corners.

Preferably, the projection 17 is linked to the other portion of each spacer 15 by a curved face. This can ease stress concentration on the exterior body 11, which is in close contact with the spacers 15, to suppress the breakage.

This may lead to an unclear boundary between the projection 17 and the other portion. Essentially, the projection 17 is a part projecting so as to extend toward the joint portion 11*a* between the first exterior body 12 and the second exterior body 13 at each corner of the exterior body 11. The projection 17 is not particularly limited. For example, in the cross section shown in FIG. 13 (a cross section along the line by which the area of the spacer 15 is divided in half (the line XIII-XIII in FIG. 8), including the apex of the projection 17 in a plan view), a portion that is closer to the tip than the inflection point A may be the projection 17.

The size of the projection 17 is not particularly limited. The thickness of the projection 17, which is indicated by D in FIG. 13, is preferably at least 0.05 times as thick as the thickness E of the spacer 15. The width of the projection 17, which is indicated by B in FIG. 8, is preferably at least twice as thick as the thickness D; and the projecting amount of the projection 17, which is indicated by C in FIG. 8, is preferably at least 0.5 times as much as the width B.

Such a spacer 15 is arranged as shown in FIGS. 5 and 6. That is, the spacers 15 are arranged inside the exterior body 11 at the corners 10*a* of the all-solid-state battery 10, respectively, between the inside of the depression 12*a* of the first exterior body 12, and the stack 14*c* of the electrode body 14. At this time, the corners (apex portions) of the stack 14*c* that are quadrilaterals in a plan view are housed inside the grooves 16 of the spacers 15, respectively.

The inner surface of the exterior body 11 is arranged so as to be in contact with surfaces of the spacers 15 which face the inner surface of the exterior body 11 (surfaces each including the projection 17); and the exterior body 11 covers so as to fit the surfaces of the spacers 15. At this time, the edges of the spacers 15 each having an edge removal shape can ease stress concentration on the exterior body 11 to suppress the breakage of the exterior body 11.

As well shown in FIG. 6, the projections 17 are arranged so as to extend toward the joint portion 11*a* of the first exterior body 12 and the second exterior body 13 at the corners 10*a* of the all-solid-state battery 10 to reduce the spaces between the joint portion 11*a* and the spacers 15, respectively.

This can suppress formation of wrinkles on the exterior body 11 at each corner 10*a* of the all-solid-state battery 10.

The material constituting the spacers 15 is preferably an electrically insulating material elastically deformed easily to some extent. This material is not particularly limited. For example, any of various resins such as thermosetting resins, ultraviolet curable resins, and thermoplastic resins can be used.

2. Production

The all-solid-state battery 10 can be produced by a known method except for the spacers 15.

There is no particular limitation, but the spacers 15 can be each produced by: pouring a molten material into a metallic mold; and curing this poured material by an appropriate method. A thermoplastic resin can be cured by cooling; and an ultraviolet curable resin can be cured by ultraviolet irradiation.

As described above, the spacers 15 are arranged at the apexes (corners) of the stack 14*c*, respectively, and the electrode body 14 with the spacers 15 attached thereto is housed inside the depression 12*a* of the first exterior body 12. The first exterior body 12 and the second exterior body 13 are then superposed on each other, and the overhang 12*b* of the first exterior body 12 and the end of the surface of the second exterior body 13 are joined to each other. At this time, vacuuming may be performed for degassing the inside of the depression 12*a*.

3. Effects Etc.

The all-solid-state battery 10 of the present disclosure, which is provided with the spacers 15, can reduce the spaces formed between the spacers 15 and the joint portion 11*a* of the exterior body 11 at the corners 10*a*, which can suppress formation of wrinkles on the exterior body 11.

Exterior bodies (especially laminated films) are weak for heat cycles (repetition of a rise and a fall in temperature). Formation of wrinkles at corners of an exterior body leads to a high probability that stress concentrates on these corners to cause cracks here. Such cracks may lead to the breakage of the exterior body to cause battery deterioration. In contrast, the all-solid-state battery 10 provided with the spacers 15 can suppress such a fault.

In some conventional examples, wrinkles are formed when an all-solid-state battery is produced, and in other conventional examples, when a battery is in use or during a heat cycle test. According to the present disclosure, formation of wrinkles can be suppressed in any of the above situations.

4. Other Embodiments

Figure 14:
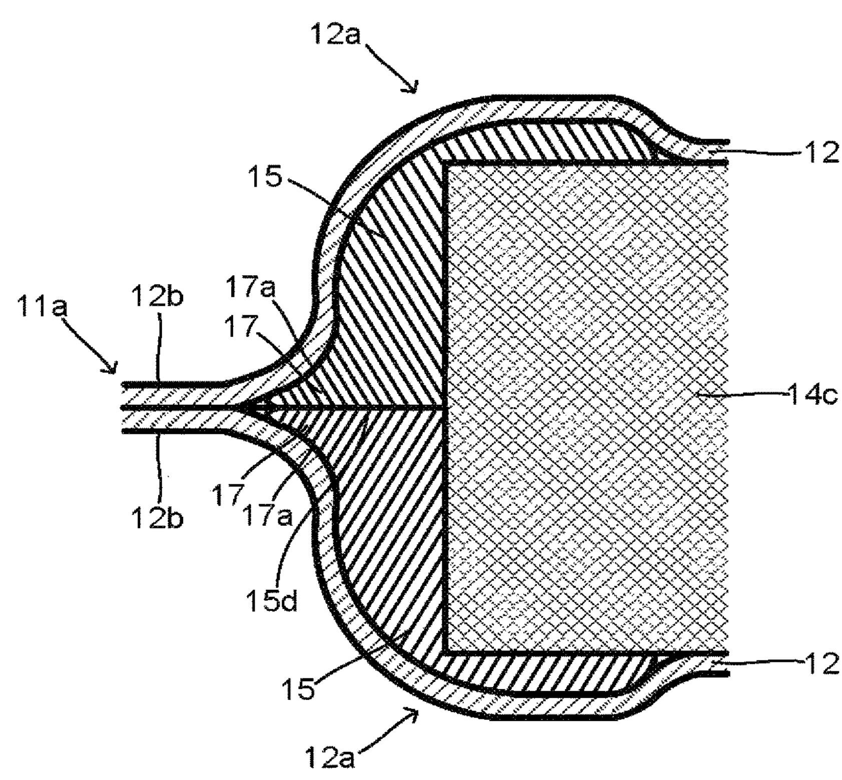
FIG. 14 illustrates an all-solid-state battery according to another embodiment.

Other than the above, the all-solid-state battery can be also formed as shown in FIG. 14. FIG. 14 corresponds to FIG. 6. In the embodiment shown in FIG. 14, the second exterior body 13 is not used, but the two first exterior bodies 12 are superposed on each other to form an exterior body. Therefore, the two first exterior bodies 12 are superposed on each other as the depressions 12*a* thereof face each other on the openings sides and the overhangs 12*b* thereof face each other. The two overhangs 12*b* form the joint portion 11*a*.

In this embodiment, each spacer 15 is arranged on both sides in the thickness direction of the electrode body 14 (a vertical direction of the sheet of FIG. 14, and the stacking direction of each layer in the stack 14*c* of the electrode body 14) at the corners of the electrode body 14. Thus, as in FIG. 14, in the present embodiment, the spacers 15 are arranged, so that the bottom faces 15*d* thereof are superposed on each other.

A battery according to such an embodiment can exert the effect same as that described above.

In the above embodiment, two members for an exterior body, that is, the first exterior body 12 and the second exterior body 13 are joined to each other. The present disclosure is not limited to this. One may fold one member for an exterior body in half to arrange an electrode body and spacers in the folded member, and join the circumferential end of the rest three sides.

In the above embodiments, the spacers arranged at the corners are separate and individual members. The present disclosure is not limited to this. For example, one may couple two spacers that are as described above via a coupling part that is arranged along one side of the stack 14*c*.

5. Examples

5.1. Structure of Electrode Body

An electrode body was formed by a known method. The specifications of each layer of the electrode body were as follows:

- Cathode current collector layer: aluminum No. 1000 to lower than 2000 in material; 10 μm in thickness
- Cathode mixture layer: NCM-based material; 50 μm in thickness
- Separator layer: sulfide solid electrolyte in material; 30 μm in thickness
- Anode mixture layer: lithium titanate in material; 50 μm in thickness
- Anode current collector layer: aluminum No. 1000 to lower than 2000 in material; 10 μm in thickness
- Dimensions of electrode body: 100 mm×200 mm; 5 mm in total thickness

5.2. Form of Exterior Body

An exterior body herein was a processed laminate sheet. The laminate sheet was formed of three layers of an insulating resin layer made from polyethylene terephthalate (PET), a metal layer made from aluminum, and a sealing resin layer made from polypropylene (PP), and had a thickness of 0.15 mm.

The dimensions of the outer shape of the exterior body were 120 mm×220 mm in a plan view. The dimensions of the outer shape of a depression were 100 mm×200 mm in a plan view, and the depth of the depression was 5 mm. The edges of the exterior body each had a curved edge removal shape: so-called R was 1 mm.

5.3. Form of Spacer

A spacer having a projection was prepared as a spacer for an example. The material of the spacer was PP (polypropylene). The length of each of side faces (the side faces 15*a* and 15*b* of the spacer 15) (the length of each of the side faces 15*a* and 15*b* in FIG. 8) was 5 mm, the thickness of the spacer (E in FIG. 13) was 6 mm, the thickness of the projection (D in FIG. 13) was 1.2 mm, the width of the projection (B in FIG. 8) was 2.4 mm, and the projecting amount of the projection (C in FIG. 8) was 1.2 mm.

In contrast, a spacer having no projection was prepared as a spacer for a comparative example. Specifically, this spacer was the same as the spacer for an example except for the projection.

5.4. Production of All-Solid-State Battery

In the example, the spacer for an example was fitted to each of the four corners of the electrode body, and the spacers and the electrode body were sealed in the exterior body.

In the comparative example, the spacer for a comparative example was fitted to each of the four corners of the electrode body, and the spacers and the electrode body were sealed in the exterior body.

5.5. Test Method

The heat cycle test was carried out on the prepared all-solid-state batteries. Specifically, the following cycle was repeated 2000 times: 100° C. in specified high temperature for 30 minutes, and −20° C. in specified low temperature for 30 minutes. The test was carried out in such a manner that: the prepared all-solid-state batteries were put in a thermostatic bath of a high and low temperature gases spaces switching type so that the temperature in the bath could reach any of the specified temperatures in approximately 10 minutes and the temperature of the all-solid-state batteries could be the specified temperature for at least 5 minutes.

5.6. Results

Figure 15:
FIG. 15 shows a result of a comparative example.
Figure 16:
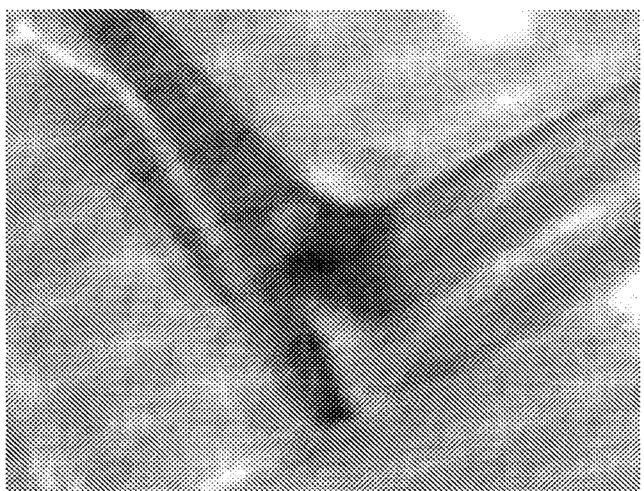
FIG. 16 shows a result of an example.

As a result of the test, in the comparative example, wrinkles were formed at some corner of the exterior body when the battery was prepared as in FIG. 15, and the exterior body cracked at the 300th cycle in the heat cycle test. In contrast to this, in the example, no wrinkle was formed as in FIG. 16, and the exterior body did not crack even after the 2000 cycles in the heat cycle test.

REFERENCE SIGNS LIST

10 all-solid-state battery
11 exterior body
14 electrode body
15 spacer
17 projection

What is claimed is:

1. A battery comprising:

an electrode body that is a quadrilateral in a plan view; and an exterior body housing the electrode body therein, wherein the exterior body has a joint portion along at least three sides thereof in a circumferential end thereof, and a depression housing the electrode body and a plurality of spacers, the spacers are arranged separately between each corner of the electrode body and an inner surface of the exterior body, each spacer has two side faces fitting each corner on an inner surface of the depression of the exterior body in a plan view, and edge formed by the side faces, and a projection projecting from the edge toward the joint portion of the exterior body, and the projection is formed so that a width thereof is tapered to a tip thereof in the plan view, and has a largest projecting amount toward the joint portion in a direction along a line by which an area of the spacer is divided in half, the line including an apex of the projection in the plan view.

2. The battery according to claim 1, wherein the projection is formed so as to be tapered to a tip thereof.

3. The battery according to claim 1, wherein the projection has a face inclining toward the joint portion in a thickness direction of the electrode body.

4. The battery according to claim 1, wherein the projection has a concave surface.

* * * * *